United States Patent [19]

Engel et al.

[11] Patent Number: 4,832,438
[45] Date of Patent: May 23, 1989

[54] INSTALLATION FOR THE ALIGNMENT OF AN OPTICAL WAVEGUIDE FOR SPLICING PURPOSES

[75] Inventors: Reinhard Engel, Munich; Rudolf Brugger, Puchheim, both of Fed. Rep. of Germany

[73] Assignee: Siemens Aktiengesellschaft, Berlin and Munich, Fed. Rep. of Germany

[21] Appl. No.: 633,539

[22] Filed: Jul. 23, 1984

[30] Foreign Application Priority Data

Aug. 12, 1983 [DE] Fed. Rep. of Germany ....... 3329293

[51] Int. Cl.⁴ ............................ G02B 6/36; G02B 7/26
[52] U.S. Cl. ................................................. 350/96.20
[58] Field of Search ................ 350/96.20, 96.21, 96.25

[56] References Cited

U.S. PATENT DOCUMENTS 4,239,333 12/1980 Dakss et al. ...................... 350/96.21
4,312,561 1/1982 Mead ................................ 350/96.21
4,373,779 2/1983 Dorsey ............................. 350/96.21
4,398,797 8/1983 Wederty et al. ................. 350/96.21

OTHER PUBLICATIONS

The Furukawawa Electric Co., Ltd., Tokyo, Japan; "Fusion Splicing of Single Mode Optical Fibers"; Jun. 1981; pp. 1-9.

Primary Examiner—William L. Sikes
Assistant Examiner—Robert E. Wise
Attorney, Agent, or Firm—Hill, Van Santen, Steadman & Simpson

[57] ABSTRACT

In an installation for alignment of an optical waveguide, particularly a monomode optical waveguide, for splicing purposes a rotary device grasping the optical waveguide is provided. This rotary device has at least one support plate resting against the optical waveguide which, in relation to the optical waveguide, is displaceably mounted in a tangential direction.

9 Claims, 1 Drawing Sheet

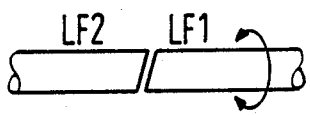
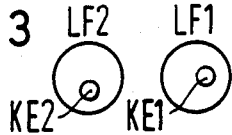
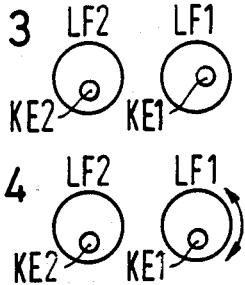
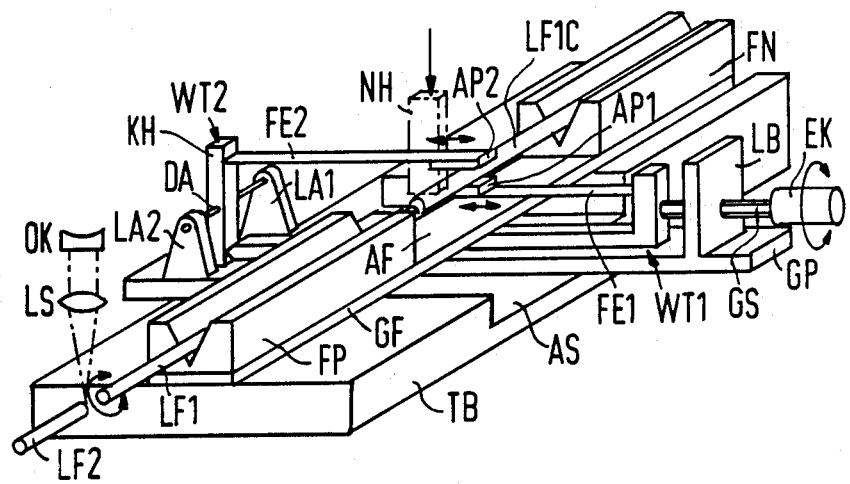

4,832,438

INSTALLATION FOR THE ALIGNMENT OF AN OPTICAL WAVEGUIDE FOR SPLICING PURPOSES

BACKGROUND OF THE INVENTION

The invention relates to an installation for the alignment of an optical waveguide, in particular a monomode optical waveguide for splicing purposes. A rotary installation is employed to grasp the optical waveguide.

An installation of this type is known from the company publication of Furukawa Electric, June 1981, "Fusion Splicing of Single Mode Optical Fibers", incorporated herein by reference. The optical waveguide to be rotated is introduced into a groove on a rotary shaft. On the groove a gear wheel is arranged. By means of a drive motor whose pinion gear engages in the cited gear wheel, a twisting of the optical waveguide is effected whereby an improved alignment is made possible, in particular in the case of monomode fibers. Due to the complicated drive installation and the construction by means of a toothed gearing and a shaft serving as the rotating element, the known apparatus is relatively costly and additionally requires considerable space for installation.

SUMMARY OF THE INVENTION

An object of the present invention is to develop an installation of the type initially cited such that, with little expense and with a simple and compact construction, the desired alignment of the optical waveguide fibers can be realized with a rotational movement. According to the invention, this is achieved in the case of an installation of the initially cited type since the rotary installation exhibits at least one support plate resting against the optical waveguide which, in relation to the optical waveguide, is mounted so as to be displaceable in a tangential direction.

In contrast to the known system in which the rotational movement of the optical waveguide is effected by a rotary shaft and thus proceeds only in a circumferential direction about the optical waveguide, in the case of the invention, a tangential movement is provided which is realizable in a substantially simpler fashion with the employed means. It is merely necessary to provide at least one support plate which is displaced tangentially over the optical waveguide (i.e. transversely to its longitudinal direction) and thus to provide a rotation and torsion of the optical waveguide. It is obvious that the tangential displacement of the support plate can be realized with a substantially lower cost in the drive installation and a lower construction space than is the case with motor-driven rotary axes with gear wheel combinations.

A particularly advantageous further development of the invention is that two diametrically opposite support plates are provided which, between themselves, enclose the optical waveguide to be twisted and are moved oppositely relative to one another. Thus, the optical waveguide, in spite of the rotation, remains at the same location.

BRIEF DESCRIPTION OF THE DRAWINGS

FIG. 1 shows, in lateral view, two optical waveguides in a non-aligned state with an unfavorable position of the fracture surfaces;

FIG. 2 shows the optical waveguide arrangement according to FIG. 1 with correspondingly aligned fracture surfaces;

FIG. 3 shows, in frontal view, two optical waveguides with an eccentric position of the core region;

FIG. 4 shows the arrangement according to FIG. 3 with flush-aligned core regions; and FIG. 5 shows, in perspective illustration, the construction of an installation according to the invention for the alignment of an optical waveguide.

DESCRIPTION OF THE PREFERRED EMBODIMENTS

In FIG. 1, two optical waveguides LF1 and LF2 are illustrated whose fracture surfaces run obliquely relative to the respective longitudinal axis. If the optical waveguides are spliced in this form (e.g. connected through welding, cementing, or the like), then a relatively high splice attenuation results. This is not the case when one of the optical waveguides, in the present example, the optical waveguide LF1, is rotated about its longitudinal axis in such a fashion until the two end faces exhibit a separation spacing which is as small as possible.

In FIGS. 3 and 4, two optical waveguides LF1 and LF2 are provided whose core regions are referenced KE1 and KE2. Particularly in the case of monomode fibers, these core regions have very small dimensions (on the order of magnitude of approximately 10 $\mu$m) and therefore, given the eccentric position of the core regions KE1 and KE2 after the splicing, a splice attenuation which is considerable results in certain circumstances. In order to avoid this, e.g. the optical waveguide LF1 is rotated about its longitudinal axis in such a fashion until the respective core region KE1 coincides in a precisely aligned fashion with the core region KE2 of the other optical waveguide LF2. In this manner, given two eccentric optical waveguide cores, the splice attenuations can be considerably reduced. As a consequence, considerable improvements of the attenuation values, particularly in the case of the small core regions of the monomode fibers, results.

In the installation according to FIG. 5, two optical waveguides LF1 and LF2 are illustrated which are to be precisely aligned relative to one another with their core regions for the purpose of preparing for a splicing operation, particularly through welding. In order to simplify the illustration, the support and clamping or chucking device for the optical waveguide LF2 is not illustrated in greater detail. It preferably comprises a construction similar to the receiving and guide installation for the optical waveguide LF1, whereby only the rotary installation can be eliminated. In addition, in the case of the illustrated installation, positioning means, not further illustrated herein, are provided which, in a known fashion allow the displacement of the optical waveguides in an axial direction, as well as allowing for height-movement and lateral movement thereof.

The various components of the installation according to the invention are arranged on a rigid and torsion-stiff support block TB which, in its center section, exhibits a section AS which serves the purpose of accommodating the parts required for the rotation of the optical waveguide LF1. For the guidance of the optical waveguide, two guide prisms FP and FN having V-shaped cutouts are provided. They are arranged in alignment on a continuous base plate GF, and the optical waveguide is positioned at the base of the V-shaped cutout. Between the guide prisms FP and FN an opening AF is disposed. The optical waveguide LF1 in the region of the very precisely manufactured guide prisms FP is already freed of its protective layer (coating). Thus, in this region, it is capable of being exactly positioned and guided. By contrast, in the right portion, in the region of the less precise guide prism FN, the protective layer is still applied on the optical waveguide and the latter is referenced there with LF1C. In order to observe the optical waveguide in the region of the splicing location, a corresponding optical installation is present, of which an eye piece OK and a lens LS are illustrated.

The rotary installation for the optical waveguide LF1 exhibits a base plate GP which contains an upwardly projecting bearing block LB provided with an internal thread. Accommodated in bearing block LB is a threaded spindle GS which can be longitudinally displaceably moved through rotation via an adjustment knob EK. The end of the threaded spindle GS strikes an angle piece WT1 which is approximately formed in an L-formation and extends beneath the base plate GS to a rotating rocker arm KH. There the end face of the angle piece WT1 strikes against the rocker arm KH pivotally mounted via a rotary shaft DA to two bearing blocks LA1 and LA2. This rotary arm KH, together with a leaf spring FE2 forms a second angle piece WT2. On the angle piece WT1 a leaf spring FE1 is likewise provided. Both leaf springs support, at their end, support plates AP1 and AP2 with which they rest, under spring pressure, on the exterior surface of the coated optical waveguide LF1C. In order to keep these optical waveguides in their position in the V-shaped grooves of the guide prisms FP and FN, a hold down device NH, illustrated in broken lines, can be provided which exerts a sufficiently large pressure on the optical waveguide, but simultaneously permits the latter to still execute a rotational movement. It is also possible to provide additional hold down devices in the region of the guide prisms FP1 and FN which, however, must likewise be selected so that the rotational movement of the respective optical waveguide piece LF1 and LF1C is guaranteed. The support plates AP1 and AP2 preferably are comprised of plastic with a sufficiently great friction resistance.

In the case of a rotational movement on the adjustment knob EK in such a manner that the angle piece WT1 is shifted to the left, the lower support plate AP1 moves to the left, whereas due to rotation of the rocker arm KH1, the upper support plate AP2 is moved to the right. Thus, the longitudinal movement of both support plates which proceeds tangentially to the surface of the optical waveguide piece LF1C, run in opposite directions, and thus exert a torque on the optical waveguide LF1C. This rotational movement is continued until, corresponding to the examples according to FIG. 2 and FIG. 4, the desired alignment resulting in the lowest splicing attenuation is obtained. This can be checked through optical and/or other measurement monitoring installations.

The end of the optical waveguide LF1C, after the guide prism FN, is preferably arranged so as to be running freely in loops or arcs in order that the generated torsional movement can be compensated over a larger longitudinal range, and in order that no undesired mechanical stresses of the sensitive optical waveguide fibers result. Through the opposite movement of the support plates AP1 and AP2 during the rotational operation, the optical waveguide fiber is spatially not displaced, i.e. it remains precisely disposed in the lowest region of the V-shaped notches of the prisms FP and FN, which was originally assigned to it. As a consequence of this, the spatial alignment according to height and lateral positioning is virtually not impaired during the rotational operation.

It would also be possible to operate with only one mobile support plate (e.g. AP2) in order to obtain a rotational movement of the optical waveguide fiber. However, this would make necessary either a fixed counter piece or a correspondingly high bearing or contact pressure. Therefore, it is more favorable to provide two diammetrically oppositely disposed support plates AP1 and AP2 which are displaceable in an opposite direction such as are illustrated in the sample embodiment.

While various minor changes and modifications might be proposed by those skilled in the art, it will be understood that we wish to include within the claims of the patent warranted hereon all such changes and modifications as reasonably come within our contribution to the art.

We claim as our invention:

1. An installation for alignment of an optical waveguide for positioning in preparation for splicing an end thereof to another waveguide end, comprising:
    means for grasping and rotating the waveguide so as to align the end of the waveguide relative to the other end in preparation for splicing;
    said means including two support plates resting against the optical waveguide and opposite one another so that the optical waveguide lies therebetween; and
    means for mounting said support plates to permit free displacement thereof in opposite directions relative to one another and in tangential directions relative to the waveguide so as to rotate the waveguide as the support plates move.

2. An installation according to claim 1 wherein means are provided for resting at least one of the support plates on the waveguide in a springy fashion.

3. An installation according to claim 1 wherein the support plates engage the waveguide in a region in which the waveguide has a protective layer thereon.

4. An installation according to claim 1 wherein a hold down means is arranged in a proximity of the support plates for holding the optical waveguide in a V-shaped guide means for lateral and longitudinal alignment of the waveguide.

5. An installation according to claim 2 wherein on each side of the support plates along a longitudinal direction of the waveguide one V-shaped guide means is provided, the optical waveguide being rotatably inserted in the two V-shaped guide means.

6. An installation according to claim 1 wherein two angle pieces are provided having at their free ends the respective support plates mounted on leaf springs connected thereto, and the angle pieces having a drive means connected thereto for producing a longitudinal displacement.

7. An installation according to claim 6 wherein longitudinal displacement is transferred to one of the support plates via a rotary mounted rocker arm.

8. A system for alignment of an end of an optical waveguide relative to an end of another optical waveguide in preparation for splicing, comprising:
    guide means having a retaining means for receiving and guiding the optical waveguide and permitting rotation without a lateral movement perpendicular to a longitudinal axis of the waveguide relative to the guide means;

rotation means adjacent the guide means for rotating the optical waveguide retained in the guide means; and said rotation means comprising first and second members each having a planar surface in contact with and tangent to a periphery of the waveguide and means for moving the members in opposite directions which are each perpendicular to the longitudinal axis of the optical waveguide such that frictional contact between the two planar surfaces and the periphery of the waveguide causes rotation of the waveguide in the guide means.

9. A system for alignment of an end of an optical waveguide with another end of another optical waveguide in preparation for splicing, comprising:

first and second guide members each having a V-shaped groove therein, and positioned such that when the V-shaped grooves are in alignment with one another longitudinal axes of the two waveguides are in alignment;

between the first and second guide members, first and second members each having a planar surface provided at opposite sides of and in tangential contact with a periphery of at least one of the waveguides;

each of the first and second members being connected by a leaf spring to respective first and second support pieces; and the first support piece comprising a rocker arm having one end thereof contacted by an extension of the second support piece such that when the second support piece and attached second member is moved in a direction perpendicular to the optical waveguide longitudinal axis in a given direction, by action of the rocker arm the first member is moved in a direction opposite thereto so that the first and second member planar surfaces impart cooperating tangential forces through frictional contact for rotating the one optical waveguide without lateral axial displacement thereof relative to the V-shaped groove as it rests in the V-shaped groove in a desired rotation direction.

* * * * *